United States Patent [19]

Balint

[11] Patent Number: 4,744,277
[45] Date of Patent: May 17, 1988

[54] METHOD AND DEVICE FOR CUTTING PIPE LENGTHS

[76] Inventor: Ludwig Balint, Bregenzer Strasse 37, A-6911 Lochau, Austria

[21] Appl. No.: 900,099
[22] PCT Filed: Dec. 5, 1985
[86] PCT No.: PCT/AT85/00054
 § 371 Date: Sep. 25, 1986
 § 102(e) Date: Sep. 25, 1986
[87] PCT Pub. No.: WO86/03440
 PCT Pub. Date: Jun. 19, 1986

[30] Foreign Application Priority Data
Dec. 7, 1984 [AT] Austria ................... 3899/84

[51] Int. Cl.$^4$ .................. B26D 3/00; B23D 21/14
[52] U.S. Cl. ........................... 83/54; 83/180;
 83/182; 83/186; 83/189; 83/188
[58] Field of Search .................. 83/54, 179, 180, 181, 83/182, 185, 186, 189, 188; 72/325, 58

[56] References Cited

U.S. PATENT DOCUMENTS

| 2,323,546 | 7/1943 | Krueger. | |
|---|---|---|---|
| 2,435,469 | 2/1948 | Roop | 83/186 |
| 3,487,668 | 1/1970 | Fuchs | 83/54 |
| 3,657,951 | 4/1972 | Clark | 83/54 |
| 3,730,035 | 5/1973 | Bhatia | 83/54 |
| 3,750,505 | 8/1973 | Organ et al. | 83/54 |
| 3,949,632 | 4/1976 | Kapaan | 83/188 |
| 3,955,453 | 5/1976 | Carmichael et al. | 83/54 |
| 4,470,330 | 9/1984 | Lindell | 83/188 |
| 4,502,308 | 3/1985 | Kelly | 72/58 |
| 4,510,830 | 4/1985 | Post | 83/186 |
| 4,649,493 | 3/1987 | Castner et al. | 72/58 |

FOREIGN PATENT DOCUMENTS

| 156117 | 9/1982 | Japan | 83/54 |
|---|---|---|---|
| 422692 | 4/1967 | Switzerland. | |
| 382483 | 7/1973 | U.S.S.R. | 83/180 |
| 617183 | 7/1978 | U.S.S.R. | 83/186 |
| 774829 | 10/1980 | U.S.S.R.. | |
| 1028441 | 7/1983 | U.S.S.R. | 83/180 |

Primary Examiner—E. R. Kazenske
Assistant Examiner—Scott A. Smith
Attorney, Agent, or Firm—Kurt Kelman

[57] ABSTRACT

A method of cutting a piece of pipe from a length of pipe in a cutting plane by gripping the length of pipe directly adjacent the cutting plane and displacing the piece of pipe with respect to the length of pipe in the cutting plane, comprises applying a radially outwardly directed and a radially inwardly directed pressure against the length of pipe and the piece of pipe in the cutting plane and at both sides thereof, simultaneously applying an axial pressure, the pressures generating a stress amounting to at least 70% of the yield point of the material of the pipe, and maintaining the pressures during the entire cutting operation. A device for carrying out this method is also disclosed.

8 Claims, 6 Drawing Sheets

METHOD AND DEVICE FOR CUTTING PIPE LENGTHS

The invention relates to a method of cutting pipe lengths as well as to a device for carrying out said method.

To date, piping has been cut to pipe lengths practically exclusively by sawing or by grinding. Another possibility is autogenous cutting.

All said methods have one common drawback, which is that a substantial loss of material is unavoidable and that the cutting speed is rather slow. Furthermore, the quality of the cutting area is very low especially if a slightly higher cutting speed is selected, so that a subsequent working of said area cannot be avoided if said area has to have little roughness.

Furthermore, it is known from Soviet Inventions Illustrated Section P 54 Week D 29 of Aug. 26, 1981, page 25, to cut piping to lengths by shearing. For said purpose, use is made in most cases of cutters or blades which grip around the pipe to be cut, with the one cutter or blade in most cases being supported eccentrically relative to the other cutter or blade. In this connection, it is known also to support the pipes from the inside by a divisible mandrel whose line of division is disposed on the plane of the abutting cutters. The drawback of said method is the low quality of the cutting areas with respect to surface roughness and dimensional stability of the cutting area. Therefore, using said cutting method leads in most cases to damage because material is torn out within the zone of the trailing cutting edge.

The objective of the invention is to propose a method of cutting pipe lengths that permits a high cutting speed and avoids loss of material and assures smooth and clean cutting areas.

According to the invention, said objective is accomplished by subjecting the wall of the pipe to be cut within the zone of the intended cutting plane to pressure at both sides of said cutting plane both from the inside and outside and also in the axial direction of the pipe, and by initiating a relative motion between the pipe and the length of pipe to be separated therefrom, while maintaining the pressure.

By said measures, the pipe to be cut is kept under a high compressive stress on all sides. In this way, it is avoided that shearing cracks are produced while the pipe is moving relative to the length of pipe to be cut, which motion causes said length of pipe to be sheared off. Said cutting by shearing in the spatial state of stress causes the material to substantially flow or slide along the shearing area, which assures a high measure of accuracy of the area and high surface quality.

In said connection, it is particularly favorable if the pressure applied to the wall of the pipe in the radial direction and in the axial direction stresses the material by at least 70%, preferably 100% of its yield limit. If such a state of stress is maintained during the cutting step, the material practically simply flows or slides along the cutting area, which results in very smooth cutting areas.

Another objective of the invention is to propose a device for carrying out the method according to the invention. Said device for carrying out the method of the invention is based on a device with closed cutters or blades surrounding the pipe, and a stop means, at least one cutter or blade being rotatable relative to the second cutter around an axis of rotation which is spaced from the center point of its penetration in the cutting plane. The cutters or blades rest against each other in a plane and a mandrel is guided in the holding device of the one cutter or blade, said mandrel being axially displaceable relative to the cutters by means of a drive, preferably a cylinder-and-piston arrangement, the cross section of said mandrel and the inside cross section of the pipe to be cut producing a forced fit. The mandrel is divided and the plane of division of its two abutting parts is disposed in the pushed-in state in the cutting plane of the two cutters or blades.

Such a device is described, for example in the above-cited publication "Soviet Inventions Illustrated". Said device is provided with a divisible mandrel for effecting an expansion or widening of the pipe to be cut, said mandrel forcing the material of the pipe to flow along the inside walls of the closed cutters or blades; however, said divisible mandrel is highly beveled within the zone of its two abutting end faces, for example with conical transitions leading from the front surfaces to the jacket surfaces, so that the radial state of stress of the material of the pipe is completely relieved after said pipe has been widened within the zone of the plane of separation, or cutting plane.

So as to be able to carry out the method of the invention with such a device, i.e., by the method by which a state of stress is maintained on all sides within the zone of the cutting plane, it is, therefore, proposed that both cutters or blades have an inside diameter such that said diameter and the diameter of the pipe to be cut jointly produce or result in a forced fit; that the facing end faces of the two parts of the mandrel define sharp edges with the convex surfaces thereof; that within this zone of transition, said parts of the mandrel have a cross section producing together with the inside cross section of the pipe to be cut a tight forced fit; and that there is provided a feeding or advancing device preferably provided with a cylinder-piston arrangement for applying a high force of pressure during the relative motion of the cutters or blades.

By said measures it is possible to maintain the pipe to be cut during the cutting operation in a state of stress on all sides. After a length of pipe has been cut from the pipe, the one part of the mandrel remains in the pipe from which said length has been cut, and after said pipe has been advanced for cutting another length of pipe, said one part of the mandrel comes into contact again with the part of the mandrel that is supported in the holding device.

Furthermore, such a device may be designed in such a way that the one holding device for receiving the mandrel and the cutter that is remote from the advancing or feeding device for the pipe to be cut, is rotatably supported on a journal, said journal being arranged eccentrically relative to the bore of the second cutter, and rotatable relative to said cutter by means of a drive. Said design results in a very simple construction.

In order to assure that the cut length of pipe is safely ejected from the cutters, on the one hand, and that the two parts of the mandrel are exactly positioned, on the other hand, the divided mandrel may be penetrating a sleeve which is slidable on said mandrel, whereby the one end face of said sleeve forms the stop means for the pipe to be cut, said end face having a shoulder which can be brought to rest against a stop of the mandrel, whereby said shoulder comes to rest on said stop when the mandrel is moving towards the cutter or blade. In this way, it is assured that the one part of the mandrel always projects by the same measure relative to the end face of the sleeve facing the pipe, assuring in this way the exact position of the area of separation or division of the mandrel.

According to another feature of the invention, the device for advancing or feeding the pipe to be cut has clamping or chucking pincers coupled with the hollow piston rod of the cylinder-and-piston arrangement, said chucking pincers being arranged between two pressure wheels, of which preferably one wheel is provided with a groove extending around said wheel. Said pressure wheels are rotatable around two axles, said axles extending parallel to each other and vertically intersecting the clamping pincers, which permits the processing even of very long pipes in a very simple way, so that little waste is produced, i.e., pipe lengths not permitting further cutting. In said arrangement, the clamping required for pushing the pipe into the cutters is accomplished or produced by the two pressure wheels in association with the clamping pincers.

So as to permit also the cutting of relatively short pipe lengths and to make best use of the material, it is provided according to another feature of the invention that the device for feeding or advancing the pipe has a hollow, cylindrical guide for pipe lengths that have to be subdivided. Said guide has a recess extending across part of its length, said recess being open at the top. The lowermost generatrix of the inside wall of said guide conforms to the lowermost generatrix of the bores of the cutters or blades, and a punch actuated by a cylinder-piston arrangement projects into said guide. In this way, even relatively short pieces of piping abutting each other can be pushed into the cutters and cut.

The invention is explained in greater detail in the following with the help of the drawing, in which.

Figure 1:
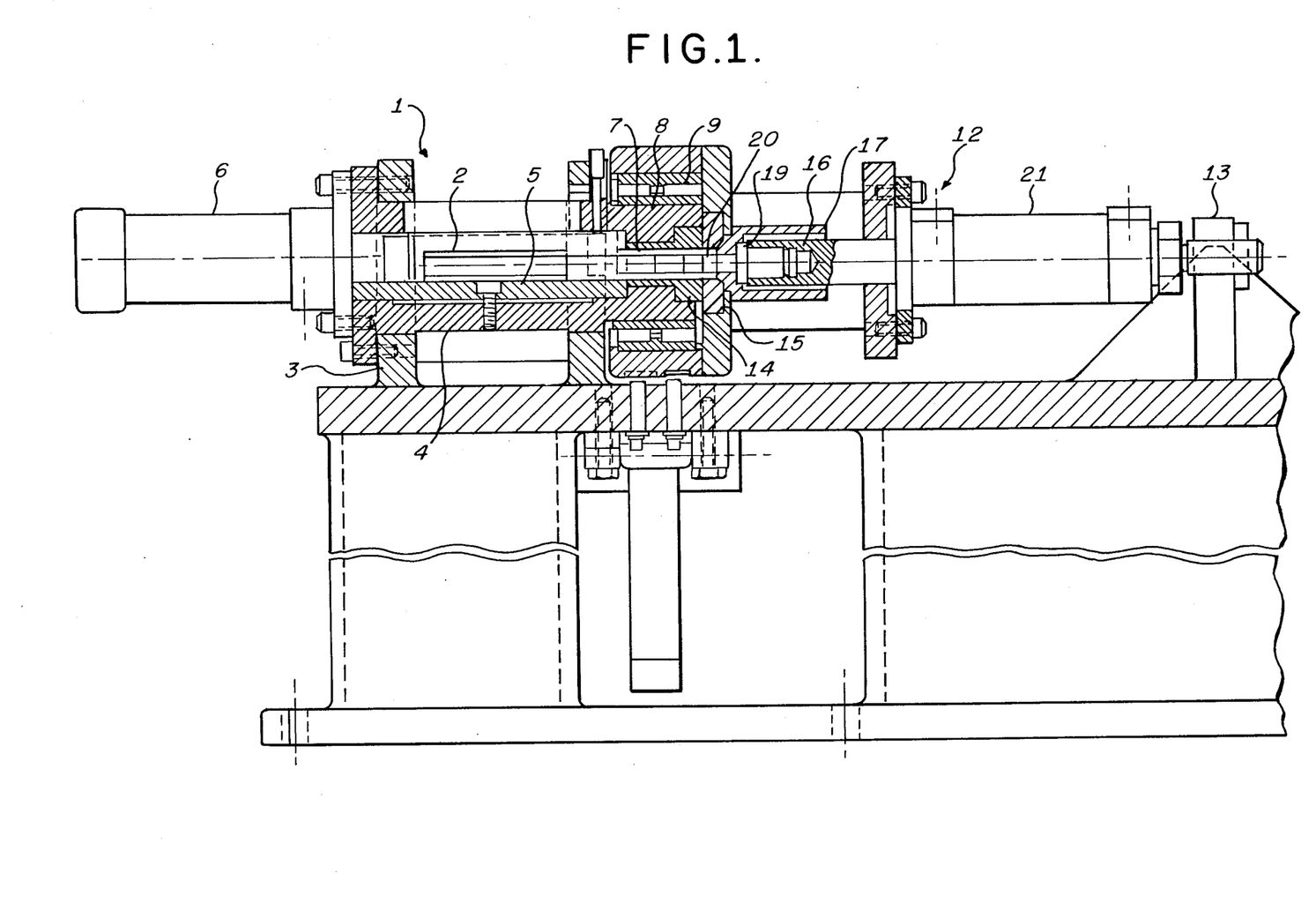
FIG. 1 shows a sectional view of a first embodiment of a device according to the invention.
Figure 2:
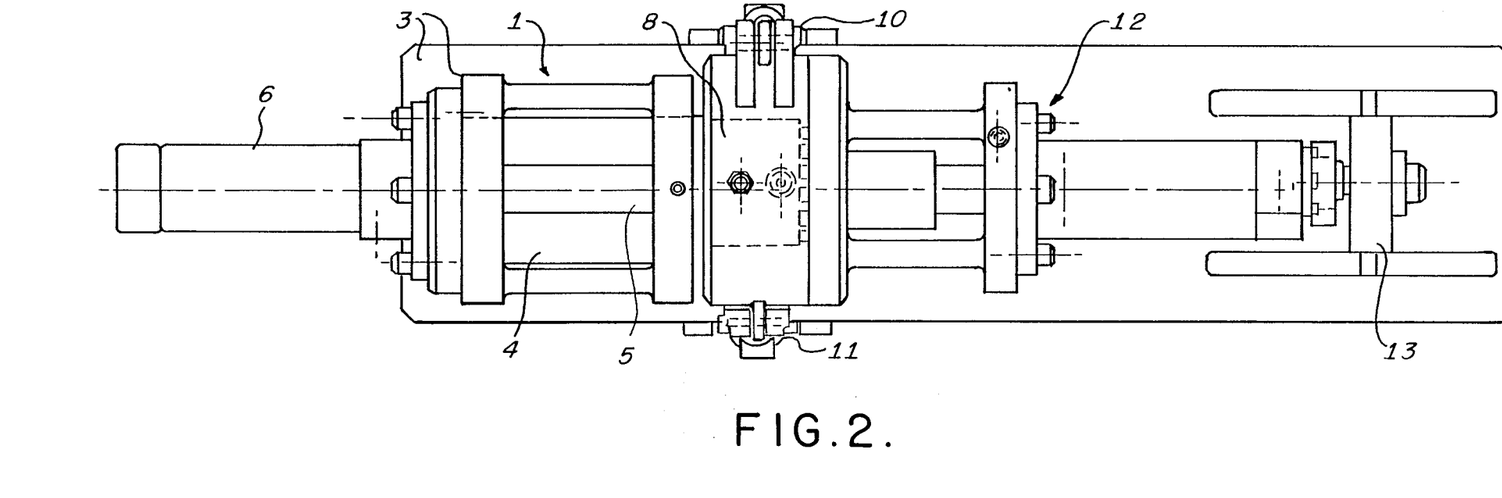
FIG. 2 shows a top view of the device according to FIG. 1.
Figure 3:
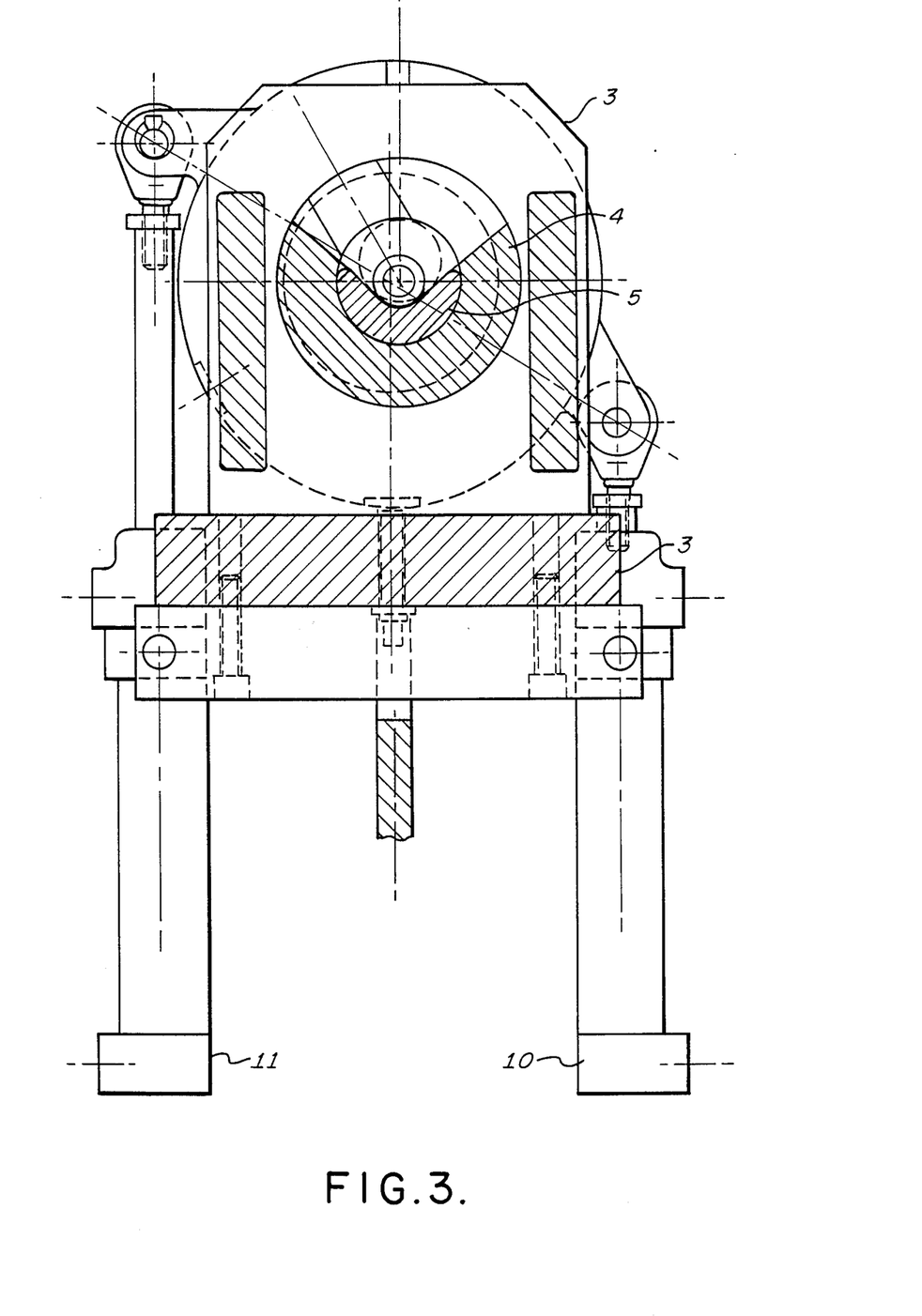
FIG. 3 shows a cross section through the device according to FIG. 1.

In the embodiment according to FIGS. 1 to 3, which is intended for processing relatively short pieces of piping, a receiving device 1 is provided for receiving the pipe lengths 2 in a machine frame 3. Said receiving device consists of a support 4 and a guide 5, the latter being exchangeably fastened on said support 4.

The support 4 is fastened on the frame 3 and connected with a cylinder-piston arrangement 6; the piston rod of said arrangement projects into the guide 5, the latter being open at the top across the major part of its length in order to permit the feeding of the pipe lengths 2. Furthermore, a guide sleeve 7 is supported in said support 4, the lowermost generatrices of the guide 5 and the bore of the guide sleeve 7 being disposed in one line.

The support 4 has a laterally displaced journal 8, the latter being disposed at the end of said support that is remote from the cylinder-piston arrangement 6. A supporting element 12 rotatable by the cylinder-and-piston arrangements 10, 11 is supported by bearing 9 on said journal. Said supporting element 12 is additionally supported in a console 13; the axis of rotation of the supporting element 12 extends coaxially with the axis of the journal 8.

A cutter or blade 14 is inserted on the free end face of the journal 8; the bore of said cutter is dimensioned in such a way that jointly with the outside diameter of the pipe length 2, it produces a forced fit by which the pipe lengths 2 are stressed within the zone of the cutting plane substantially up to the yield limit. In said arrangement, the bottom generatrix of the bore of the cutter 14 extends coaxially with the lowermost generatrices of the guide and the guide sleeve 7.

Another cutter 15 is inserted in the end face of the supporting element 12, which faces the cutter 14. The bore of said cutter 15 is also dimensioned in such a way that a forced fit is produced with the pipe lengths 2.

A sleeve 17 is displaceably arranged in the supporting element 12 in a bore 16; the one end face of said sleeve serving as a stop for the pipe lengths 2. On its inside, said sleeve 17 has a shoulder 18 for stopping a stop means 19 of a mandrel 20. Said mandrel 20 is screwed to the end face of a piston rod of a cylinder-piston arrangement 21, said arrangement being part of the supporting element 12.

The mandrel 20 itself is divided into two parts, one part being screwed into the piston rod and reaching in its pushed-in state up to the cutting plane of the two cutters 14 and 15. The second part 20' of the mandrel is butt-joined with the mandrel 20.

The mandrel 20, 20', except for a leading zone, has a diameter which, together with the inside diameter of the pipe lengths 2, produces a forced fit, by which the pipe lengths are stressed substantially up to their yield limit.

Pieces of piping are cut from the pipe lengths 2 by placing a pipe length 2 in the guide 5 and by advancing said pipe length by the cylinder-piston arrangement 6 against the cutters 14 and 15 and forcing said pipe length 2 into said cutters, whereby the pipe lengths are stressed at least to close to their yield point.

Subsequently, the mandrel 20 is pressed or forced into the pipe length 2, taking along the sleeve 17 until said sleeve comes to rest on a stop of the supporting element 12, whereby the position of the pipe length 2 is fixed at the same time and the mandrel 20, 20' is disposed with its plane faces of separation exactly in the cutting plane of the two cutters 14 and 15.

Subsequently, the supporting element 12 is rotated or turned by the two cylinder-piston arragements 10, 11, which causes the two cutters to be displaced against each other due to the way in which the cutter 14 is supported, which is coaxially with the guide 5 and the cylinder-piston arrangement 6, and thus eccentric with respect to the journal 8, i.e. due to the axially displaced positions of the axes of rotation of the cutters 14 and 15. Said displacement of the cutters 14 and 15 and the state of stress of the pipe length 2 within the zone of the cutting plane of the cutters produces smooth flowing of the material within the zone of the cutting plane, resulting in very smooth and practically plane cutting areas.

Figure 4:
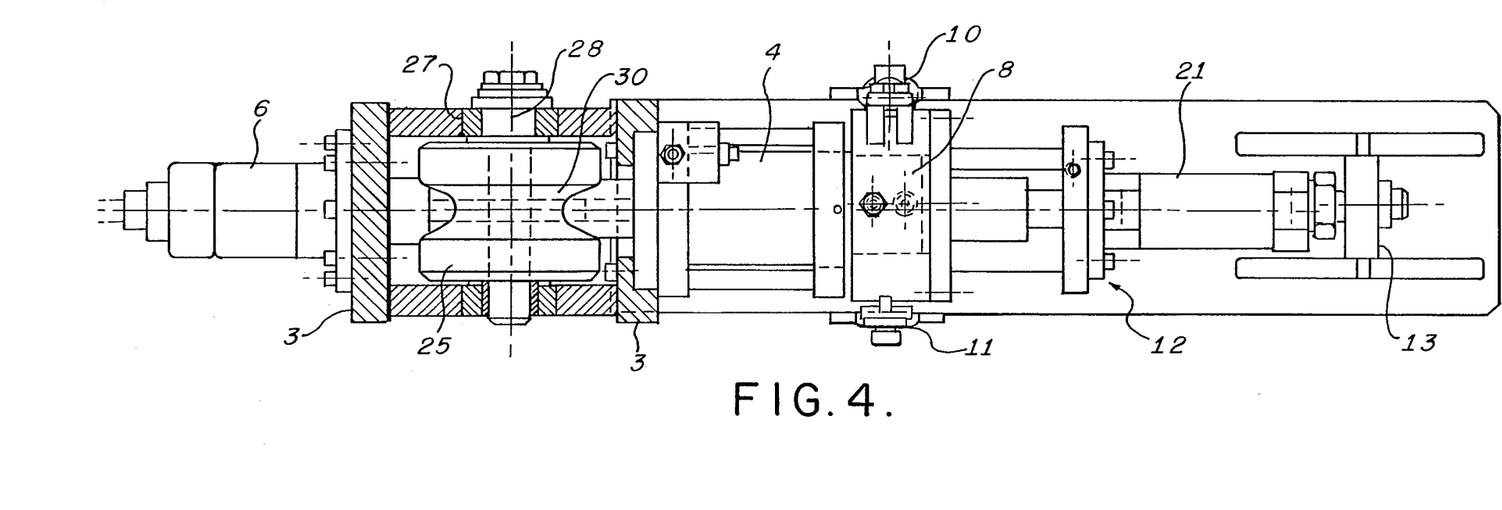
FIG. 4 is a top view of another embodiment of the invention.
Figure 5:
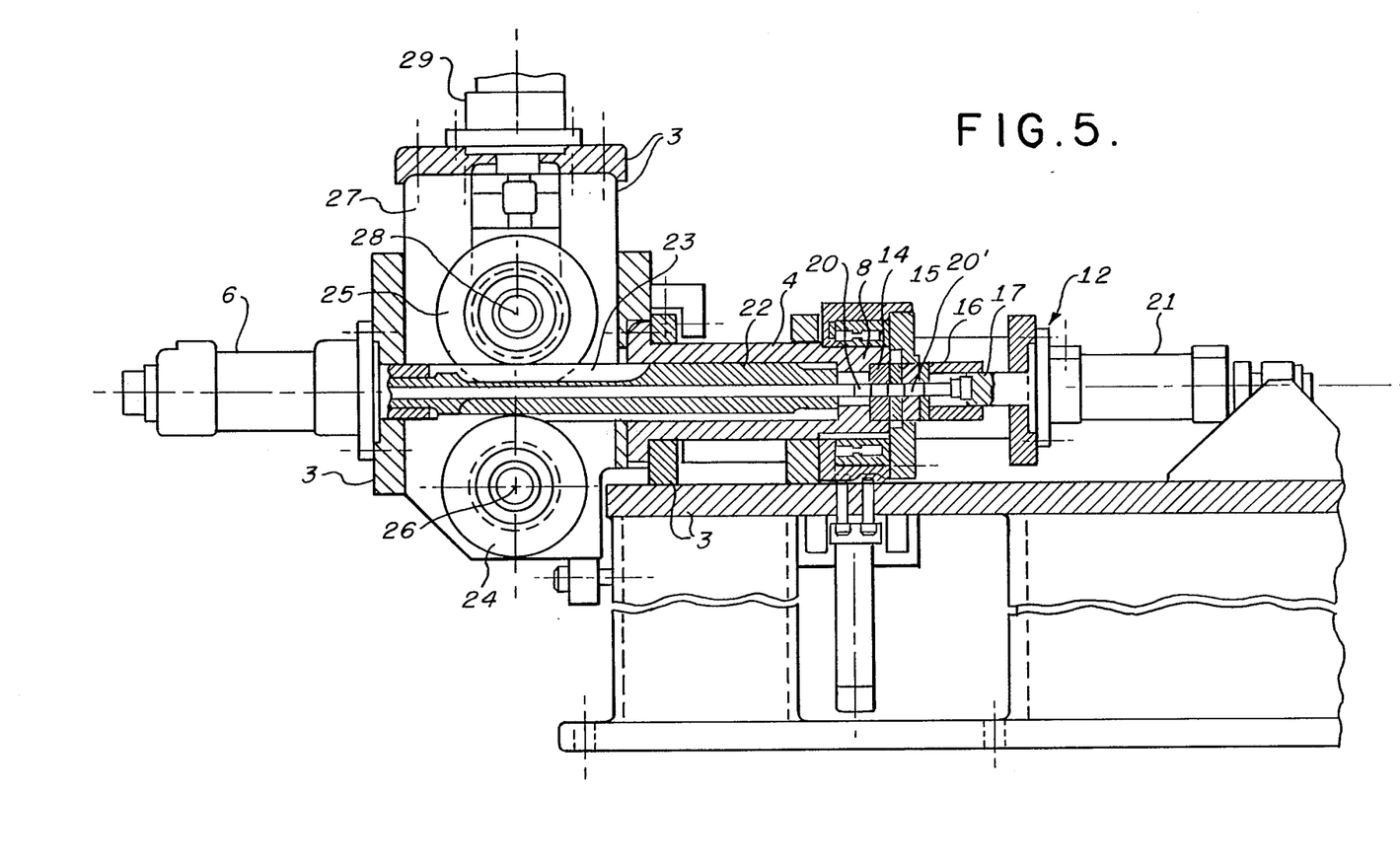
FIG. 5 shows an axial section through the device according to FIG. 4.
Figure 6:
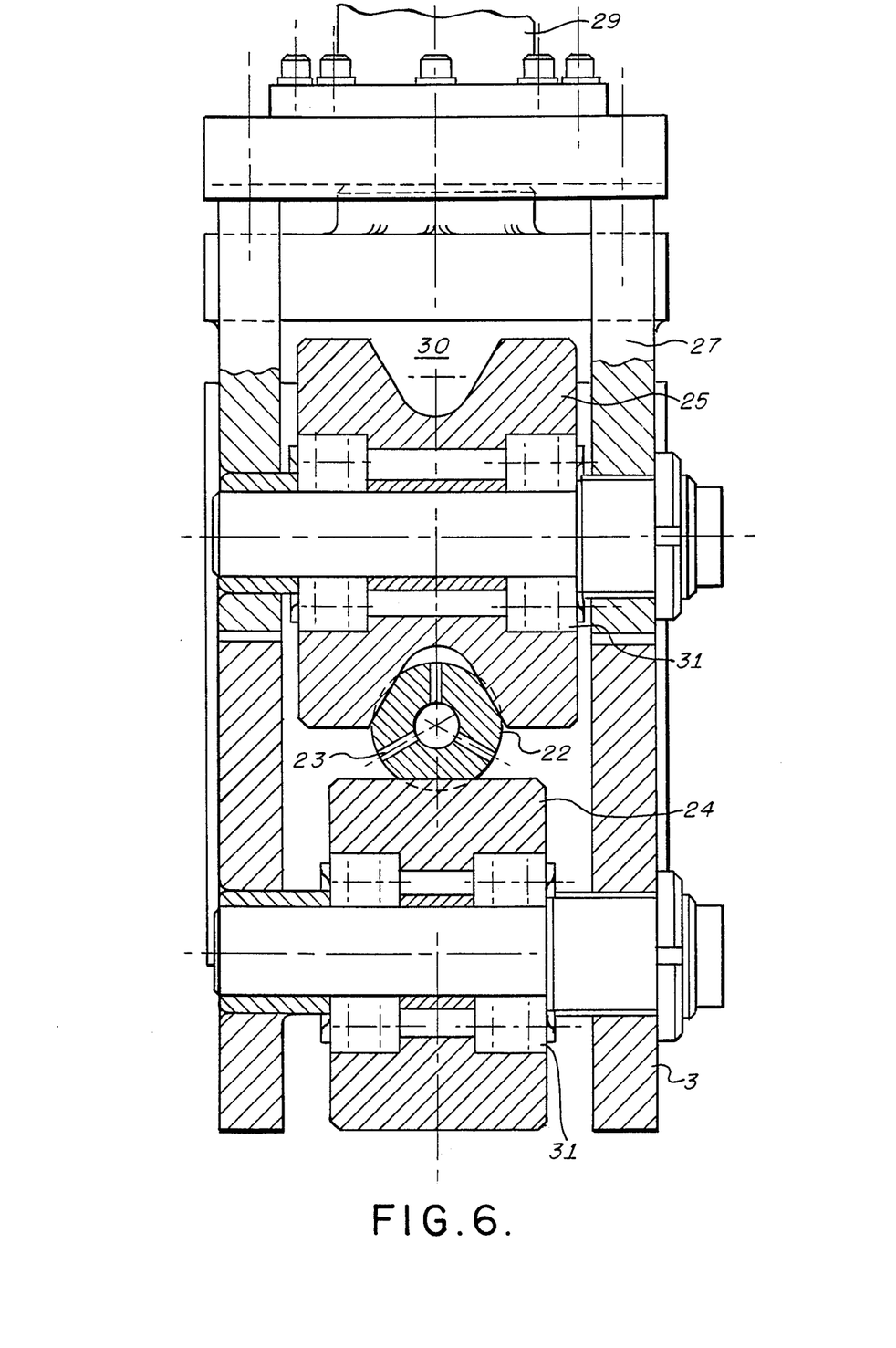
FIG. 6 is a cross sectional view of the device according to FIG. 4.

The embodiment according to FIGS. 4 to 6 differs from the one according to FIGS. 1 to 3 in that instead of using a receiving station 1, chucking pincers 22 are provided, said pincers being coupled with the hollow piston rod of the cylinder-piston arrangement 6, which is fastened on the machine frame 3. Said chucking pincers 22 are guided in a bore of the support 4, which accommodates also the guide sleeve 7. Furthermore, the support 4 accommodates the cutter 14 and, by means of the journal 8 and the bearing 9, supports the supporting element 12, the latter being designed as the one according to FIGS. 1 to 3.

The clamping between the pipe 2' and the clamping pincers 22, the latter having the slots 23 disposed within the zone facing the cylinder-piston arrangement 6 and being designed in their other end zone as a non-slotted bushing, is accomplished by means of the two pressure wheels 24, 25, of which the pressure wheel 24 is stationary by means of a axle 26 supported in the frame 3, but supported rotatably, with the clamping pincers 22 resting on said wheel 24.

The second pressure wheel 25 is rotatably supported and vertically displaceable in a holding device 27 by means of an axle 28, said holding device being vertically displaceable in the frame 3. Said holding device 27 is displaceable by means of a cylinder-piston arrangement 29 supported on the frame 3, so that the pressure wheel 25, said wheel being provided with the groove 30 which extends around said wheel and largely conforms to the cross sectional shape of the chucking pincers, can be pressed or forced against the chucking pincers 22.

The two pressure wheels 24 and 25 are supported by their axles 26 and 28, respectively, via the bearings 31.

The mode of operation of the device according to FIGS. 4 to 6 is different from the one of the device according to FIGS. 1 to 3 only in that before the piston rod of the cylinder-piston arrangement 6—which, in FIG. 5, is shown in its foremost position—is retracted, the pressure wheel 25 is slightly lifted from the chucking pincers 22 by cylinder-piston arrangement 29. The pipe 2', which is guided in the sleeve-like part of the chucking pincers 22 with only very little play or clearance, is safely supported in the bore of the cutter 14 due to the tight forced fit of the pipe 2', said cutter 14 being supported in the journal 8 of the support—which journal 8 is displaced relative to the axis of the chucking pincers 22—coaxially with the chucking pincers 22, so that the pipe cannot be carried along by said chucking pincers when said pincers are retracted.

Before the pipe is advanced against the cutters 14 and 15 for the purpose of cutting another piece or length of pipe 2', the pressure wheel 25 is again forced against the chucking pincers 22, which assures that the pipe 2' is carried along and the previously cut length of pipe is simultaneously pushed from the cutter 15, said cutter 15 having returned to its initial position and being controlled by the cylinder-piston arrangements 10, 11, and that the pipe is pushed into the blade 15. Of course, during said step, the cylinder-piston arrangement 21 of the supporting element 12 is not pressurized in order to permit the sleeve 17 to be pushed back.

As the pipe 2' is pushed into the cutter 15, the end face or surface of the mandrel part 20' facing said cutter is shifted to the cutting plane of the two cutters 14 and 15. By admitting pressure to the cylinder-piston arrangement 21, the mandrel 20 is advanced against the cutter 14, carrying along the sleeve 17.

In this way, the free end face of the mandrel 20 comes to a rest on the mandrel part 20' and the sleeve 17 is simultaneously forced against the end face of the pipe 2.

The further advance and its insertion of the pipe 2' in the cutters 14, 15 for cutting another length of pipe and the cutting of said length of pipe by rotating the supporting element 12 supporting the cutter 15 is identical with the way in which the pipe lengths 2 are pushed into the cutters 14, 15 in the device according to FIGS. 1 to 3.

In said device, the pieces of piping remaining in the cutter after a length of pipe has been cut are ejected by further advancing the pipe lengths 2 by means of the cylinder-piston arrangement 6, and inserting or pushing in the pipe length 2 which is to be divided, or cut. In said steps, the cutter 15 or the supporting element 12, after the last piece of piping has been cut, has to be again in its initial position, in which the bore of the two cutters 14, 15 are aligned with each other.

Basically, it is to be noted that the supporting element 12 is rotated or turned relative to the support by an angle sufficient to cause the two cutters 14 and 15 to be displaced against each other by the measure of the wall thickness of the pipe 2, 2' to be cut, said displacement being caused by the displacement of the axis of rotation of the supporting element 12 relative to the axis of the bore of cutter 14.

Figure 7:
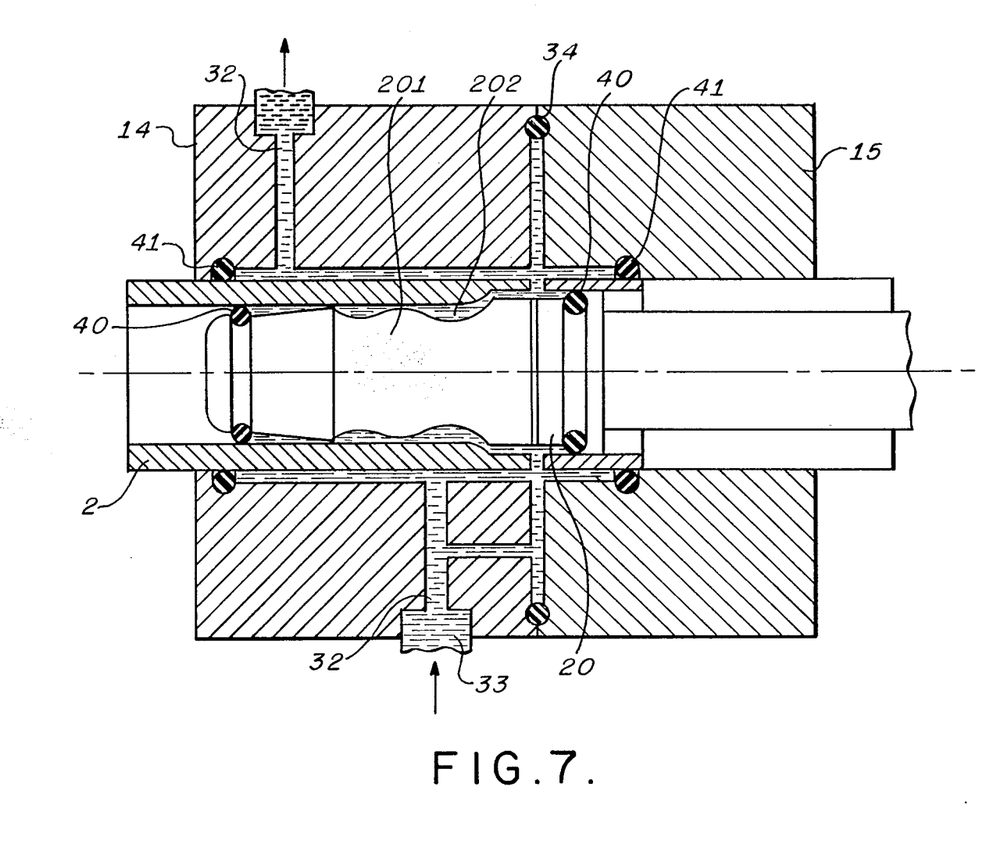
FIG. 7 is a schematic view of a detail of the cutter or blade arrangement.

FIG. 7 shows a schematic view of the arrangement of the cutters 14, 15 and the mandrel 20. In said arrangement, the part 201, which substantially conforms to the element 20' according to FIGS. 1 and 5, has within the zone of the cutting plane or plane of separation of the two cutters 14, 15 and the part 20 a diameter exceeding the inside diameter of the pipe 2 to be cut, so that said pipe is widened solely by reduction of the wall thickness.

Furthermore, the part 201 of the mandrel 20, said part having the leading zone, has the grooves 202. Both the part 201 and the part 20 of the mandrel each are provided with a gasket 40, which gaskets are forced against the inside wall of the pipe 2 to be cut, sealing said wall. In addition, the gaskets 41 are placed in the cutters 14 and 15 in matching grooves for sealing the outside wall of the pipe 2.

The cutter 14 is provided with oil ducts 32 through which pressure oil is admitted from the oil inlet 33 between the outside wall of the pipe 2 and the cutters 14 and 15, as well as between the abutting surfaces of the cutters 14 and 15; the cutter 14 is provided with a groove for receiving a gasket 34.

In addition, while the two cutters 14, 15 are displaced against each other during the cutting of a length of pipe, pressure oil is admitted between the parts of the mandrel 20 and the inside wall of the pipe 2. Usefully, said oil is admitted into the oil ducts at a pressure of, for example 400 to 500 bar; measurements have shown that pressures in the order of about 20 kbar are generated in the oil film between the surfaces of the mandrel 20 that are in contact with each other, and the pipe 2 to be cut or the cutters 14, 15 and the pipe 2. In this way, it is assured that within the zone of the cutting plane, the pipe to be cut is stressed accordingly in the radial direction. In the axial direction, the pipe 2 to be cut is subjected to a stress as high as the one in the embodiments according to FIGS. 1 to 6, so that the pipe 2 to be cut is subjected to a stress within the zone of cutting which, on all sides, is within the range of the flow limit of the material of pipe 2.

Furthermore, the friction is reduced by the film of oil so formed. In order to enhance the resistance to wear of the mandrel 20 and the cutters, said parts usefully may be coated with titanium nitride and, if need be, polished to high or mirror metal gloss, which leads to a very low coefficient of friction, high surface hardness and excellent wettability of the oil. Furthermore, such coating largely excludes the hazard of seizing and cold fusion between the parts.

What I claim is:

1. A method of cutting a piece of pipe from a length of pipe in a cutting plane by gripping the length of pipe directly adjacent the cutting plane and displacing the piece of pipe with respect to the length of pipe in the cutting plane, which comprises the steps of
    (a) applying a radially outwardly directed and a radially inwardly directed pressure against the length of pipe and the piece of pipe in the cutting plane and at both sides thereof,
    (b) simultaneously applying an axial pressure, the pressures generating a stress amounting to at least 70% of the yield point of the material of the pipe, and
    (c) maintaining the pressures during the entire cutting operation.

2. The cutting method of claim 1, wherein the pressures generate a stress mounting to at least 100% of the yield point of the material of the pipe.

3. A device for cutting a piece of pipe from a length of pipe in a cutting plane by gripping the length of pipe directly adjacent the cutting plane and displacing the piece of pipe with respect to the length of pipe in the cutting plane, which comprises
    (a) two cooperating cutters defining a bore in the cutting plane for receiving the length of pipe and surrounding the same, the bore having a diameter providing a force fit for the length of pipe, the cutters abutting each other in the cutting plane,
        (1) one of the cutters being rotatable with respect to the other cutter about an axis of rotation spaced from the center of the bore in said one cutter,
    (b) a support for the one cutter,
    (c) an axially displaceable two-part mandrel, one mandrel part being arranged on the support,
        (1) the mandrel parts having end faces facing each other in an abutment plane and convex surfaces fitting into the length of pipe, the end faces defining sharp edges with the convex surfaces in the abutment plane, and the end faces having a cross section in said abutment plane providing a tight force fit with the interior cross section of the length of pipe for applying a high radially outwardly directed pressure thereupon upon rotation of the one cutter with respect to the other cutter,
    (d) a drive for axially displacing the two-part mandrel until the abutment plane is coplanar with the cutting plane,
    (e) a stop for axially holding the length of pipe in position, and
    (f) a feeding drive for axially displacing the pipe towards the cutting plane and said top, respectively.

4. The cutting device of claim 3, wherein the drives are cylinder-and-piston drive.

5. The cutting device of claim 3, further comprising a journal rotatably mounting the support, the journal being arranged eccentrically to the bore of the outer cutter and farther from the pipe feeding drive than the other cutter, and another drive for rotating the one cutter.

6. The cutting device of claim 3, further comprising a sleeve receiving the two-part mandrel, the sleeve being displaceable on the mandrel and having an end face forming the stop for the length of pipe, the sleeve having a shoulder and the mandrel having a stop means, the shoulder of the sleeve engaging the stop means of the mandrel when the mandrel is axially displaced.

7. The cutting device of claim 3, wherein the feeding drive is a cylinder-and-piston drive, the pipe feeding drive having a hollow piston rod and comprising chucking pincers coupled to the hollow piston rod, and further comprising two pressure wheels, the chucking pincers being positioned between the pressure wheels, the pressure wheels being rotatable about parallel axes of rotation perpendicularly intersecting the chucking pincers, and at least one of the pressure wheels being displaceable perpendicularly to the chucking pincers.

8. The cutting device of claim 3, wherein the feeding drive is a cylinder-and-piston drive for axially feeding pieces of pipe to be cut, further comprising a hollow cylindrical guide for the cylinder-and-piston drive, the guide defining an upper opening extending over a portion of the length of the guide for receiving the pieces of pipe, the guide having an inner wall whose lowest generatrix is in alignment with the lowest generatrices of the cutter bores, and a ram projecting into the guide and actuated by the cylinder-and-piston drive.

* * * * *